United States Patent [19]

Trigg

[11] 4,369,685
[45] Jan. 25, 1983

[54] BAND SAW BLADE

[76] Inventor: Donald L. Trigg, 10934 Gazette Ave., Chatsworth, Calif. 91311

[21] Appl. No.: 195,989

[22] Filed: Oct. 10, 1980

[51] Int. Cl.³ .............................................. B23D 61/12
[52] U.S. Cl. ...................................... 83/661; 76/112; 76/DIG. 6; 83/698
[58] Field of Search ......................... 83/661, 835, 698; 76/DIG. 6, 112

[56] References Cited

U.S. PATENT DOCUMENTS

| 161,263 | 3/1875 | Newhall | 83/661 |
| 201,444 | 3/1878 | Pratt | 83/661 |
| 907,168 | 12/1908 | Neill | 83/835 |

Primary Examiner—Frank T. Yost
Attorney, Agent, or Firm—Nilsson, Robbins, Dalgarn, Berliner, Carson & Wurst

[57] ABSTRACT

An improved band saw blade for crafting the interior of a workpiece without defacing its periphery. A planar blade is provided having mating ends. Means located in the mating ends of the blade allow the blade to be threaded through the interior of the workpiece then joined to achieve a belt-like operational configuration.

7 Claims, 9 Drawing Figures

BAND SAW BLADE

BACKGROUND OF THE INVENTION

TECHNICAL FIELD

The present invention relates to woodcrafting apparatus and the like. More particularly, the present invention relates to means for producing decorative and utilitarian design work in the interior of a workpiece by means of a band saw.

PRIOR ART

The band saw of today provides the user with a versatile automatic tool. The saw commonly includes a belted blade which operates between a power pulley and a freely rotating pulley in much the same manner as the fan belt of the automobile. The blade can be replaced by loosening the tension thereon as a result of the movement of the two pulleys closer together, the exact mechanism for which will depend upon the particular model and make of the saw.

The saw provides a rugged, versatile device capable of both relatively heavy cutting (in lieu of the hand saw) and detail work (replacing the need for the jigsaw). The latter characteristic of the band saw is particularly welcomed by the woodworking profession and hobbyists. A competitor in this regard, the jigsaw, possesses a much smaller blade which is easily broken. Additionally, the jigsaw blade is anchored at both top and bottom to complex mechanisms, further degrading the reliability of the device. A large portion of the appeal of the jigsaw is due to the fact that it possesses a straight blade, as opposed to a belt, enhancing its attractiveness for interior sculpting. This is unlike the band saw blade, which cannot access the interior of a workpiece without cutting through the periphery. The jigsaw blade, in contrast, may be removed from the machine, then threaded through a hole drilled in the workpiece. In this manner, the workpiece can be carved from within leaving no telltale edge cuts. As mentioned above, however, jigsaw blades frequently break, and, due to their small widths, are prone to leave undesirable irregularities as they cut (the result of vibration introduced by the peculiarities of the jigsaw mechanism), necessitating significant finishing efforts, including a large amount of sanding and the like.

SUMMARY OF THE INVENTION

It is therefore an object of the present invention to achieve a band saw blade capable of performing cutting and sculpting operations in the interior of a workpiece which leaves no telltale access cut its periphery.

It is another object of the present invention to achieve the above object without undue delay or interruption in the use of the band saw.

It is yet another object of the present invention to achieve the foregoing objects in an ecomonical manner.

It is yet still another object of the present invention to achieve a device that provides the user with the advantages of a band saw, including its smooth cutting action, which results from the mechanical stability of its belt-like blade and at the same time allows him to achieve the accessability of the jigsaw blade to the interior of a workpiece without defacing its periphery.

It is a further object of the present invention to provide a means for sculpting the interior of a workpiece which does not require peripheral access and yet is not hampered by the operational instability of the jigsaw.

These and other objects are achieved by the present invention wherein there is provided an improved band saw blade. The blade comprises a first blade member and a second blade member laminated thereto, each of the blade members being planar, of substantially constant thickness and having opposed ends. The blade members are of substantially equal lengths and aligned with their ends offset to form a joint. The blade, includes means comprising interlocking mating members including a first mating means associated with the first blade member and a second mating means associated with the second blade member to transform the planar blade into a belt-like configuration. The planar nature of the blade, with free ends, allows the user to thread it through a hole drilled into the interior of the workpiece. The mating ends allow the user then to assemble the blade into a belt-like configuration which may then be circulated across the pulleys of the band saw.

The invention will best be described by reference to the detailed description and drawings which follow. In the drawings and the description, the reader will note that like characters refer to like parts throughout.

BRIEF DESCRIPTION OF THE DRAWINGS

In FIG. 3a, one is shown a side view of the male half of the mating joint of the embodiment. In FIG. 3b, there is shown a view of the member of FIG. 3a from below, allowing one to observe the alignment of the protrusions of FIG. 3a. In FIG. 3c, there is illustrated the specific embodiment of the joint as engaged to its mating member;

DETAILED DESCRIPTION

Figure 1:
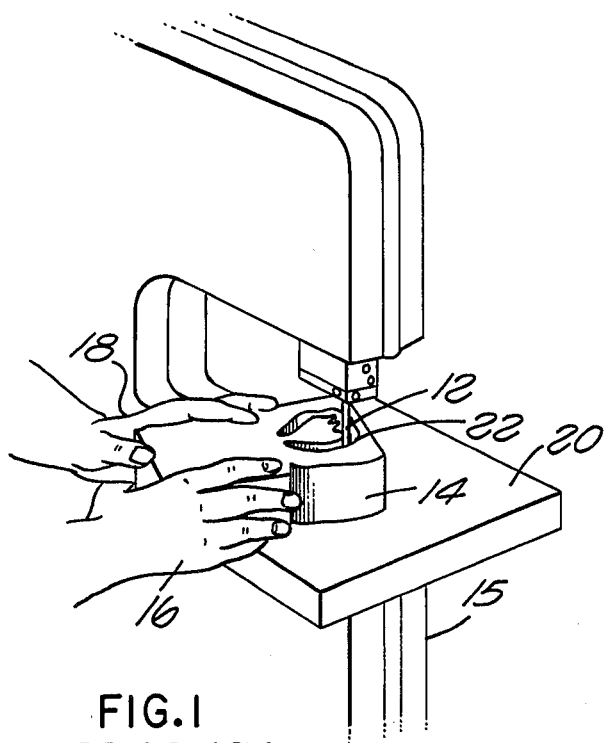
FIG. 1 illustrates the operation of a present-day band saw upon a workpiece. This view illustrates the problems of the user in attempting to use the present-day band saw to sculpt a design at the interior of the workpiece.

Referring now to FIG. 1, there is shown the manner of use of a present-day band saw 10 to accomplish the carving or sculpting of the interior of a workpiece 14 of wood or the like.

A belt-like band saw blade 12 having a serrated edge for cutting purposes is suspended between a pair of pulleys (not shown) housed within opposed cowlings 13, 15. A table 20 defines the work area upon which the user may place the workpiece 14 which he guides with his hands 16, 18 past the moving blade 12.

In FIG. 1, a worker is attempting to use the band saw 10 to perform decorative sculpting at an inner portion of the workpiece 14. It is noted that, to perform such work, it is necessary to make a starting cut 22 into the workpiece 14 which, in all likelihood will have to be hidden from view and/or filled to avoid the unseemly appearance it adds to the finished design. As an alternative, it has been known by those in the art that interior sculpture may be performed with a band saw if one is willing to go to the trouble of breaking the blade 12, threading the blade 12 through a hole in the workpiece 14, then rewelding the break. The aforementioned process is both time-consuming and harmful to the blade 12. To avoid these hindrances and others, the inventors have devised an improved blade, disclosed infra, that allows one to obtain the convenience and advantages of the band saw 10 without the aforesaid disadvantages.

Figures 2A, 2B:
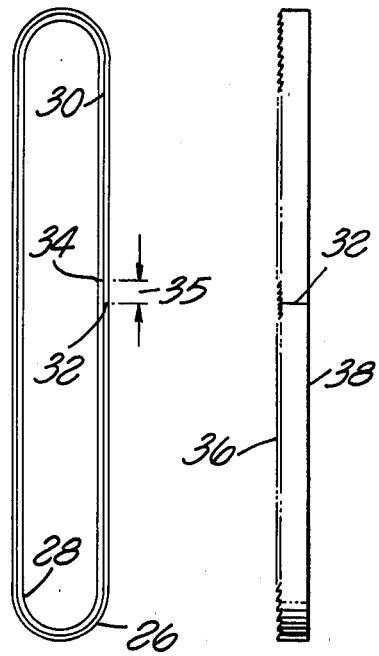
FIGS. 2a and 2b are edge and top views, respectively, of an improved band saw blade according to the present invention in its operational, belt-like configuration.

In FIG. 2a, there is shown an edge view of the improved band saw blade of the present invention while a top view thereof is shown in FIG. 2b. Referring to FIG. 2a, it is seen that the improved blade comprises a pair of individual band saw blades 26, 28 which have been laminated together along an interface 30 by means of, inter alia, a plastic adhesive, such as silicone, so that there exists little if any sacrifice in blade flexibility. Spring steel or the like may be successfully employed for the constituent blade halves 26, 28.

Break seams 32, 34 are located in the blade halves 26, 28, respectively. The region of the interface 30 between the break seams 32, 34 is not laminated and provides the location of means for mating the ends of the blade which, absent such interlocking, is essentially a plane member.

FIG. 2b, a top view of the blade 26, shows once again the break seam 32 which runs from the smooth or plane edge 38 of the band saw to the cutting or serrated edge 36.

Figure 3A:
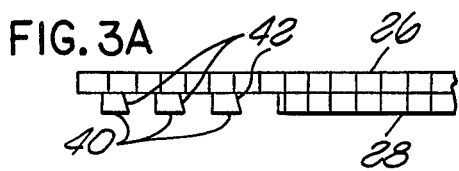
FIGS. 3a, 3b and 3c relate to one preferred embodiment of the present invention.
Figure 3B:
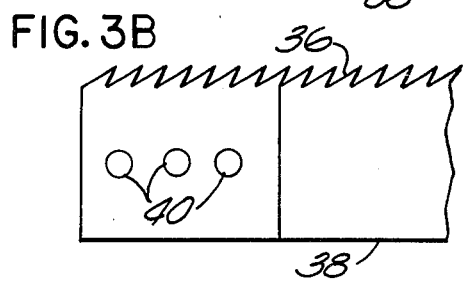
Figure 3C:
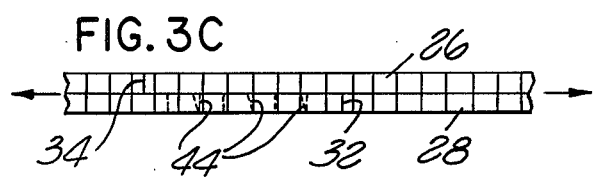

FIGS. 3a through 3c illustrate one mating means. In FIG. 3a, there is shown the male member which is seen to comprise three peg-like devices 40 arranged on the underside of the outer blade half 26. Each of the pegs 40 includes an inclined rear edge 42 which gives the peg a somewhat flared appearance. In FIG. 3b, one can see that the pegs 40 are essentially round and mounted in a line. They need not be of such round configuration but might be square or even triangular and yet retain the flared shape of FIG. 3a. Additionally, some other number than three pegs, either more or less, might be employed, either in a row, as shown in FIG. 3b, or in some other configuration. In FIG. 3c, one can see how the interlocking of the members is accomplished between the break points 32 and 34. Mating female members 44 may be of a larger cross-section than the pegs 40, and, in fact, need not have identically shaped cross-sections; that is, they might be square or round depressions regardless of the cross-sectional shape of the pegs 40. The halves of the blade 28 are maintained together by the tension forces pulling the opposed ends of the blade 24 in opposite directions. As a result, the lower edges of the pegs 40 are maintained in a pressure-fit engagement to the lower portion of the walls of the depressions 44. Thus, the operator, after threading the opposed ends of the blade through a drilled hole in the workpiece 14, need only make certain that he squeezes the opposed mating members 40, 44, together, prior to tensioning the band saw blade. He can then be assured that the blade will retain a belt-like shape during operation.

Figure 3D:
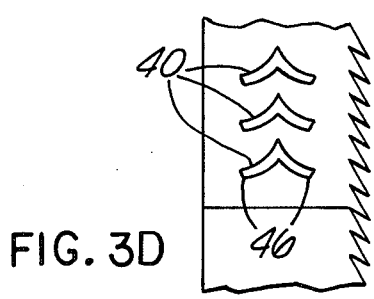
FIG. 3d is a view of the underside of the male half of an alternative embodiment of the mating joint of the present invention.

FIG. 3d illustrates a chevron-type cross-section as an alternative to the pegs of FIG. 3b. This configuration is especially advantageous in that the pressure fit between the male member of FIG. 3d and the mating member, whether it be a matching chevron depression or a nonmatching rectangle, is concentrated at opposed edges 46 of the rear of the chevron to maximize the lateral stability of the joint. It may be noted that an edge view of the chevroned members, as in FIG. 3a, might additionally disclose a flared geometry, thus producing a pressure fit possessing both of the aforementioned pressure concentrations vertical and horizontal to further stabilize the joint.

Figure 4A:
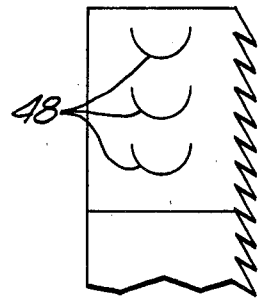
FIGS. 4a and 4b illustrate, respectively, the underside of the male half and an edge view of the mating members according to a further alternative embodiment of the invention.
Figure 4B:
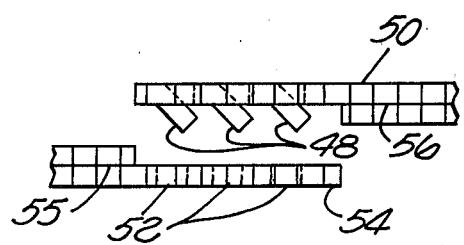

In FIGS. 4a and 4b, there is shown a third alternative design for the mating means located in the ends of the band saw blade of the invention. This configuration may be conveniently fabricated by a die-punching process. Male members 48 are formed by the die-punching of semi-circular portions of the upper blade half 50. The protruding edges punched through engage appropriately-sized and shaped depressions 52 of the blade half 54. (The blade halves 50, 54 can be laminated at several convenient places, as opposed to lamination throughout their lengths.) However, there must be welded (rigidly jointed) section at the blade ends, locations 55 and 56. Once again, a close pressure fit is maintained by the tensioning of the members at the joint.

Although the detailed description has proceeded with reference to a band saw blade having one serrated edge for cutting, the concepts disclosed might equally be adapted to a blade lacking saw teeth. Sanding belts, presently made for band saws, which, in operation, are mounted in like manner to, and utilize the identical belt-like configuration of carving or cutting-type band saw blades (such as blade 12 of FIG. 1) might be equally adapted to utilize the teachings of the invention. Such sanding belts commonly made of fabric, adhering to which there is an abrasive sanding or polishing compound, face the same interior access difficulty as the band saw blade of the prior art.

Thus it is seen that there has been brought to the woodcrafting and related arts a new tool for sculpting and finishing the interior of a workpiece. By employing a band saw blade and/or sanding belt according to the present invention, the user can obtain the advantages of band saw cutting and finishing with minimal inconvenience. When the normal operation of the band saw or sanding belt is required, the joints described above maintain the device in a belt-like configuration throughout operation. When, however, it becomes necessary to work on the interior of a piece of wood or plastic without making peripheral cuts therethrough, the joint can be easily disengaged after the untensioning of the device by releasing at least one of the pulleys of the band saw, a common feature of present-day saws. After a hole has been drilled within the workpiece, the ends of the device can be threaded therethrough and easily press-fit together as the pulleys again tension the blade. The apparatus is now in condition for the sculpting and/or finishing of the interior of the workpiece.

What is claimed is:

1. In a band saw blade having a belt-like configuration to allow the blade to circulate during operation, the improvement comprising:
    (a) said blade comprising a first blade member and a second blade member laminated thereto, each of said blade members being planar, of substantially constant thickness, and having opposed ends;
    (b) said blade members being of substantially equal lengths and aligned with their ends offset to form a joint; and
    (c) means associated with said joint, said means comprising interlocking mating members including first mating means associated with said first blade member and a second mating means associated with said second blade member for securing said joint so that said blade may be threaded through an interior portion of a work piece and assembled into a belt-like configuration for operation.

2. A band saw blade as defined in claim 1 wherein said first mating means comprises at least one peg and said second mating means comprises at least one mating depression.

3. A band saw blade as defined in claim 2 wherein said at least one peg includes an inclined edge.

4. A band saw blade as defined in claim 2 wherein said at least one peg is chevron-shaped cross-section.

5. A band saw blade as defined in claim 1 wherein said first mating means comprises at least one flap and said second mating means comprises at least one mating depression.

6. A band saw blade as defined in claim 1 wherein said first blade member is laminated to said second blade member by a plastic adhesive.

7. Apparatus as defined in claim 6 wherein said adhesive is silicone.

* * * * *